United States Patent [19]

Mueller

[11] 3,903,143

[45] Sept. 2, 1975

[54] STEREOSELECTIVE REDUCTION OF 9-KETO PROSTANOIC ACIDS AND ESTERS

[75] Inventor: Richard A. Mueller, Glencoe, Ill.

[73] Assignee: G. D. Searle & Co., Chicago, Ill.

[22] Filed: Sept. 25, 1972

[21] Appl. No.: 291,708

Related U.S. Application Data

[63] Continuation-in-part of Ser. No. 152,414, June 11, 1971, abandoned.

[52] U.S. Cl........ 260/514 D; 260/345.7; 260/345.8; 260/448.8 R; 260/468 D
[51] Int. Cl.².................... C07C 51/00; C07C 61/38
[58] Field of Search..................... 260/408 D, 514 D

[56] References Cited
OTHER PUBLICATIONS

Corey et al., III, 93, 1491, (1971).

House, Modern Synthetic Reactions, pp. 89–93, (1972).

Corey et al., I, J.A.C.S. 93, 7319, (1971).

Brown et al., J.A.C.S. 92, 709, (1970).

Corey et al., II, J.A.C.S. 90, 3245, (1968).

House, Modern Synthetic Reactions, p. 60, (1972).

*Primary Examiner*—Robert Gerstl
*Attorney, Agent, or Firm*—John A. Dhuey

[57] ABSTRACT

Prostanoic acids and esters containing an alicyclic ketone substituent are reduced stereoselectively to the corresponding α-hydroxy prostanoic acids or esters with an alkali metal perhydro-9b-boraphenalylhydride. The prostaglandins so produced are useful as pharmacological agents.

10 Claims, No Drawings

STEREOSELECTIVE REDUCTION OF 9-KETO PROSTANOIC ACIDS AND ESTERS

This application is a continuation-in-part of copending application Ser. No. 152,414, filed June 11, 1971, now abandoned.

The invention described hereinafter is concerned generally with a process for the production of prostaglandins. More particularly, it is concerned with a stereoselective process for the reduction of an alicyclic ketone moiety on a prostaglandin-like nucleus to the α-hydroxy moiety. That reduction is accomplished by employing an alkali metal perhydro-9b-boraphenalylhydride as the reducing agent.

Prostanoic acids and alkyl and aralkyl esters thereof intended as starting materials for the practice of the instant invention generally contain the C-20 carbon nucleus of the formula

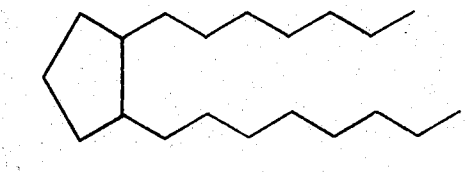

with a ketone substituent on the cyclopentane ring. However, fully equivalent to the C-20 compounds for the purposes of this invention are the homologous compounds having shorter or longer aliphatic side chains, as for example, the ω-homo and ω-dihomo prostanoic acids and esters. The prostanoic acids and esters may have various sites of unsaturation such as $\delta^5$, $\delta^{8(12)}$, $\delta^{10}$, $\delta^{13}$, $\delta^{5,13}$ and various substituents on the carbon nucleus such as 11-hydroxy, 15-hydroxy, 19-hydroxy, 11-tetrahydropyran-2-yloxy, 11trimethylsiloxy or 15-methyl. The foregoing enumeration is not meant to limit the invention to those particular compounds as other substituents which are compatible with the reducing agent and other sites and degrees of unsaturation can be present in the starting compounds during the practice of the instant process. The alkyl and aralkyl radicals comprehended contain 1–18 carbon atoms and are illustrated by methyl, ethyl, isopropyl and benzyl.

Generally the reduction process does not affect other substituent groups in the molecule. For example, β-ketols and α, β-unsaturated olefinic ketones can be reduced without affecting the unprotected hydroxy substituent or the unsaturation.

The alkali metal perhydro-9b-boraphenalylhydrides, represented by the following formula

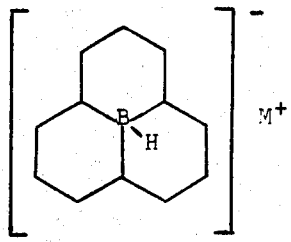

wherein M represents an alkali metal, illustrated by sodium, potassium and lithium, are prepared by methods disclosed by H. C. Brown, et al., JACS, 92:3, 709 (1970).

Preferred as starting materials are those compounds which contain 9-oxo and 11-hydroxy substituents, especially an 11α-hydroxy substituent. Since the hydroxy moiety and the double bond remain unreduced during the reaction, reduction of those compounds according to the instant process produces the 9α, 11α-dihydroxy prostaglandins belonging to the F series of prostaglandins. Especially preferred are those starting materials having the 9-oxo, 11α-hydroxy and 15-hydroxy or 15-oxo substituent and a $\delta^{5,13}$ or $\delta^{13}$ double bond, such as $PGE_1$ and $PGE_2$ or their 15-keto derivatives. Reduction of those compounds affords a convenient and facile route to $PGF_{1\alpha}$ and $PGF_{2\alpha}$ and related compounds, which possess important pharmacological properties.

The instant process is practiced preferably by contacting the appropriate prostanoic acid or ester starting material with an alkali metal perhydro-9b-boraphenalyl=hydride in an inert solvent at low temperature.

In an especially preferred embodiment of the instant process, a 9-keto or 9,15-diketo prostanoic acid or ester is contacted with lithium perhydro-9b-boraphenalylhydride in tetrahydrofuran at a temperature between about —80° to —70°C.

Typically, dl-11α-hydroxy-9,15-dioxoprost-13-trans-enoic acid is treated with lithium perhydro-9b-boraphenalylhydride in tetrahydrofuran at —78°C to produce dl-9α, 11α, 15α-trihydroxyprost-13-trans-enoic acid and dl-9α, 11α, 15β-trihydroxyprost-13-trans-enoic acid.

The various stereoisomeric mixtures produced in the instant process may be separated by standard chromatographic techniques which are well-known in the art. Particularly useful are those methods described by Miyano, et al., J. Org. Chem. 37(11), 1810 (1972).

The process generally is run at low temperatures and under inert atmosphere due to the highly reactive nature of the alkali metal perhydro-9b-boraphenalylhydrides. A temperature range of about —100°C. to 0° has been found satisfactory with a range of —70°C. to —80°C. particularly preferred. Higher temperatures such as those near 0°C. are recommended only if the process is conducted under very dilute conditions. Suitable solvents are illustrated by tetrahydrofuran, 1,2-dimethoxyethane, dioxane, tetrahydropyran and diethyleneglycol dimethylether.

The process is especially valuable because it is highly stereospecific. Thus, when the alicyclic keto substituent is reduced, one obtains exclusively the α isomer. Consequently, when a 9-keto starting material is employed, the product is a 9α-hydroxy compound rather than a mixture of 9α- and 9β-hydroxy compounds. This result is obviously desirable because it affords compounds containing the configuration which characterizes natural prostaglandins such as $PGF_{1\alpha}$. Furthermore, when a starting material containing a 15-keto group is employed, one obtains a preponderance of 15α-hydroxy compound in comparison to the amount of 15β-hydroxy compound produced. By means of this stereo-specificity, one is able to obtain directly from a 9,15-diketo prostaglandin a mixture of only the 9α, 15α-dihydroxy and 9α, 15β-dihydroxy isomers, with the major amount of that mixture being the 9α, 15β-dihydroxy compound. Because this advantage is combined with the fact that an unprotected 11-hydroxy substituent can be present in the starting material, this process offers a highly advantageous route to PGF$_{1\alpha}$ and its derivatives. However, if the hydroxy substituent is protected, such as with a tetrahydropyranyl radical, a still greater amount of the 9α, 15α-dihydroxy isomer is obtained.

The invention will appear more fully from the examples which follow. Those examples are given by way of illustration only and are not to be construed as limiting the invention either in spirit or in scope as many variations in materials and methods will be apparent to those skilled in the art. In the examples temperatures are given in degrees Centigrade (°C.) and quantities of material and parts by weight unless parts by volume is noted. The relationship between parts by weight and parts by volume is the same as that existing between grams and milliliters.

EXAMPLE 1

0.1 Part of dl-11α-hydroxy-9,15-dioxoprost-13-trans-enoic acid is dissolved in 10 parts by volume of dry, peroxide-free tetrahydrofuran and the resulting solution is cooled to −78°C. in a dry ice-acetone bath under a nitrogen atmosphere and stirred. The glassware used had been previously heated to 110°C. for 12 hours in order to drive off surface water. 10 Parts by volume of 0.9 N solution of lithium perhydro-9b-boraphenalylhydride in tetrahydrofuran is added dropwise over a period of approximately 10 minutes and the reaction mixture turns light orange in color. After approximately 30 minutes, 10 parts of water is added and the solution is allowed to warm to room temperature and decanted. 20 Parts of water is added and the solution is then extracted with ethyl acetate. The aqueous phase is acidified to a pH of 3 to 3.5 with 0.01 N hydrochloric acid and extracted with ethyl acetate. The ethyl acetate extracts are combined and washed, first with water and then with aqueous saturated sodium chloride solution, then dried over anhydrous sodium sulfate. The solvent is removed under reduced pressure at 30°C. to afford 0.097 part of total products. Thin layer chromatography indicated this to be approximately 80% dl-9α, 11α, 15α-trihydroxyprost-13-trans-enoic acid and 20% dl-9α, 11α, 15β-trihydroxyprost113-trans-enoic acid. Chromatography of the total products on silicic acid using ethyl acetate with increasing amounts of acetone as eluant affords dl-9α, 11α, 15α-trihydroxyprost-13-trans-enoic acid and dl-9α, 11α, 1-5β-trihydroxyprost-13-trans-enoic acid.

EXAMPLE 2

0.1 Part of dl-11α-hydroxy-9,15-dioxoprost-13-trans-ehoic acid is dissolved in 10 parts by volume of tetrahydrofuran and the resulting solution is cooled to −78°C. and stirred under nitrogen. 10 Parts by volume of a 0.9 N solution of lithium perhydro-9b-boraphenalylhydride in tetrahydrofuran is added dropwise over a 10 minute period. After about 30 minutes, the reaction mixture is acidified to pH 3 to 3.5 with 0.01 N hydrochloric acid and then allowed to warm to room temperature. The solution is extracted three times with ethyl acetate and the ethyl acetate extracts are combined and dried over anhydrous sodium sulfate. Removal of the solvent at 30°C. under reduced pressure yields a mixture of the desired products and the by-products of the decomposition of the reagent. Chromatography on silicic acid according to the method of Example 1 affords, as pure products, about 80% dl-9α, 11α, 15α-trihydroxyprost-13-trans-enoic acid and 20% dl-9α, 11α, 15β-trihydroxyprost-13-trans-enoic acid. The by-products of the decomposition of the reducing agent are very non-polar and were eluted from the column in the first few fractions.

EXAMPLE 3

0.09 Part of 11α, 15(S)-dihydroxy-9-oxoprost-13-trans-enoic acid is dissolved in 5 parts by volume of tetrahydrofuran and the resulting solution is cooled under nitrogen with magnetic stirring to −78°C. Then, 5 parts by volume of a 0.43 M solution of lithium perhydro-9b-boraphenalylhydride is added dropwise over a period of approximately 10 minutes. The solution is maintained at −78°C. for about 30 minutes with stirring, then 10 parts of water is added and the solution is allowed to warm to room temperature. The reaction mixture is extracted twice with ethyl acetate. The aqueous phase is acidified with 0.01 N hydrochloric acid to a pH of about 3 to 3.5, then is extracted with ethyl acetate. The combined ethyl acetate extracts are washed twice with saturated aqueous sodium chloride solution and dried over anhydrous sodium sulfate. The organic solvent is removed at about 35°C. under reduced pressure to afford crude crystalline 9α, 11α, 15(S)-trihydroxyprost-13-trans-enoic acid. Thin layer chromatographic analysis of that material shows the presence of only 9α, 11α, 15(S)-trihydroxyprost-13-trans-enoic acid. Recrystallization of the crude material from a mixture of ethyl acetate and cyclohexane affords the pure product.

Repetition of the procedure described above using an equivalent quantity of dl-11α, 15α-dihydroxy-9-oxoprost-13-trans-enoic acid affords dl-9α, 11α, 15α-trihydroxyprost-13-trans-enoic acid.

EXAMPLE 4

When the procedure described in Example 3 is repeated using 0.10 part of dl-15α-hydroxy-9-oxoprosta-10,13-trans-dienoic acid, there is obtained dl-9α, 15α-dihydroxyprosta-10,13-trans-dienoic acid. That product is identified by thin layer chromatography.

EXAMPLE 5

0.01 Part of dl-9,15-dioxoprosta-11,13-trans-dienoic acid is treated according to the procedure described in Example 3, except that the solvent employed is 1,2-dimethoxyethane. The products, which are identified and separated by thin layer chromatography, are approximately 75% dl-9α, 15α-dihydroxyprosta-11,13-trans-dienoic acid and 25% dl-9α, 15β-dihydroxyprosta-11,13-trans-dienoic acid.

EXAMPLE 6

A solution consisting of 1.23 parts of 11α, 15(S)-dihydroxy-9-oxoprosta-5-cis,13-trans-dienoic acid and 178 parts of dry, distilled tetrahydrofuran is treated at −78° under a nitrogen atmosphere with 32 parts by volume of a 0.9 N lithium perhydro-9b-boraphenalylhydride in tetrahydrofuran solution, dropwise over a 15 minute period. When the addition is complete, the solution is stirred for an additional ½ hour at −78°. Then 20 parts of water is added and the solution is allowed to warm to room temperature. An additional 400 parts of water is added and the resulting solution is extracted with ethyl acetate. The aqueous layer is separated, then acidified with hydrochloric acid and extracted with ethyl acetate. The organic extract is washed with saturated sodium chloride and dried over anhydrous sodium sulfate and the solvent is evaporated under reduced pressure, thus affording 9α, 11α, 15(S)-trihydroxyprost-5-cis,13-trans-dienoic acid. That compound displays an optical rotation in tetrahydrofuran of about +24.8°.

EXAMPLE 7

0.090 Part of 11α, 15(S)-dihydroxy-20-methyl-9-oxoprost-13-trans-enoic acid is treated according to the procedure described in Example 6, thus affording 9α, 11α, 15(S)-trihydroxy-20-methylprost-13-trans-enoic acid. The pure compound, obtained after recrystallization from ethyl acetate-benzene, exhibits a melting point of about 103°–105° and an optical rotation in tetrahydrofuran of about +20.0°.

EXAMPLE 8

Substitution of an equivalent quantity of 15(S)-hydroxy-9-oxoprosta-5-cis,10,13-trans-trienoic acid in the procedure of Example 6 affords 9α, 15(S)-dihydroxyprosta-5-cis,10,13-trans-trienoic acid. Also produced is a small amount of 9α, 15(S)-dihydroxyprosta-5-cis,13-trans-dienoic acid. Those compounds are separated by thin layer chromatography.

EXAMPLE 9

By substituting an equivalent quantity of sodium perhydro-9b-boraphenalylhydride in the procedure of Example 1, there are obtained products identical to those of Example 1.

EXAMPLE 10

By substituting an equivalent quantity dl-methyl 11α-hydroxy-9,15-dioxoprost-13-trans-enoate in the procedure of Example 1, there is afforded a mixture of dl-methyl 9α, 11α, 15α-trihydroxyprost-13-trans-enoate and dl-methyl 9α, 11α, 15β-trihydroxyprost-13-trans-enoate.

EXAMPLE 11

When an equivalent quantity of dl-11β-hydroxy-9,15-dioxoprost-13-trans-enoic acid is substituted in the procedure of Example 1, there is obtained dl-9α, 11β, 15α-trihydroxyprost-13-trans-enoic acid and dl-9α, 11β, 15β-trihydroxyprost-13-trans-enoic acid.

What is claimed is:

1. The process which comprises adding, at a temperature between about −100° to 0° C in an inert solvent, lithium perhydro-9b-boraphenalylhydride to starting material comprising a 9-keto prostanoic acid or ester of the formula

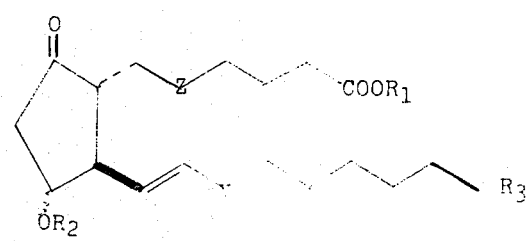

wherein $R_1$ is hydrogen or lower alkyl, $R_2$ is hydrogen, tetrahydropyan-2-yl or trialkylsilyl, $R_3$ is hydrogen or methyl, z is —CH=CH— or —(CH$_2$)$_2$—, Y is hydroxymethylene or carbonyl and the wavy line represents the α or β configuration or mixture thereof, and isolating the resulting product comprising a 9α-

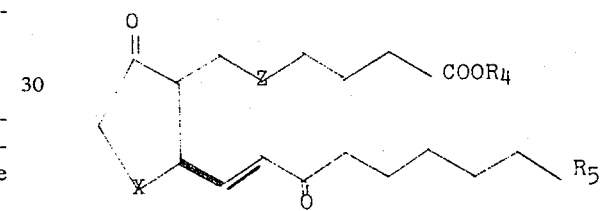

wherein $R_1$, $R_2$, $R_3$ and Z are defined as above and Y is hydroxymethylene.

2. The process which comprises adding, at a temperature between about −100° to 0° C in an inert solvent, lithium perhydro-9b-boraphenalylhydride to starting material comprising a 9,15-diketo prostanoic acid or ester of the formula wherein $R_4$ is hydrogen or lower alkyl, $R_5$ is hydrogen or methyl, Z is —CH=CH— or —(CH$_2$)$_2$— and X is methylene, hydroxymethylene, tetrahydropyan-2-yloxymethylene or trialkylsiloxymethylene, and isolating the product which comprises a mixture of a major amount of the resulting 9α, 15α-dihydroxyprostanoic acid or ester and a minor amount of the resulting 9α, 15β-dihydroxyprostanoic acid or ester.

3. The process according to claim 2, wherein the starting material is dl-11α-hydroxy-9,15-dioxoprost-13-trans-enoic acid and the product is a mixture of a major amount of dl-9α, 11α, 15α-trihydroxyprost-13-trans-enoic acid and a minor amount of dl-9α, 11α, 15-β-trihydroxyprost-13-trans-enoic acid.

4. The process according to claim 1, wherein the starting material is 11α, 15(S)-dihydroxy-9-oxoprost-13 -trans-enoic acid and the product is 9α, 11α, 15(S)-trihydroxyprost-13-trans-enoic acid.

5. The process according to claim 1, wherein the starting material is dl-11α, 15α-dihydroxy-9-oxoprost-13-trans-enoic acid and the product is dl-9α, 11α, 15α-trihydroxyprost-13-trans-enoic acid.

6. The process according to claim 1, wherein the starting material is 11α, 15(S)-dihydroxy-9-oxoprosta-5-cis,13-trans-dienoic acid and the product is 9α, 11α, 15(S)-trihydroxyprosta-5-cis,13-trans-dienoic acid.

7. The process according to claim 1, wherein the starting material is 11α, 15(S)-dihydroxy-20-methyl-9-oxoprost-13-trans-enoic acid and the product is 9α, 11α, 15(S)-trihydroxy-20-methylprost-13-trans-enoic acid.

UNITED STATES PATENT OFFICE
CERTIFICATE OF CORRECTION

PATENT NO. : 3,903,143
DATED : September 2, 1975
INVENTOR(S) : Richard A. Mueller It is certified that error appears in the above-identified patent and that said Letters Patent are hereby corrected as shown below:

Column 1, line 37, "11trimethylsiloxy" should read -- 11-trimethylsiloxy --.

Column 2, line 65, "15β" should read -- 15α --.

Column 3, line 45, "trihydroxyprostl13" should read -- trihydroxyprost-13 --.

Column 3, line 53, "ehoic" should read --enoic --.

Column 6, line 6, after "9α-" add -- hydroxy prostanoic acid or ester of the formula --.

Signed and Sealed this third Day of February 1976

[SEAL]

Attest:

RUTH C. MASON
*Attesting Officer*

C. MARSHALL DANN
*Commissioner of Patents and Trademarks*